US012579481B2

(12) United States Patent
Sagawa et al.

(10) Patent No.: US 12,579,481 B2
(45) Date of Patent: Mar. 17, 2026

(54) FLUID MACHINE, FLUID MACHINE MANAGING METHOD AND FLUID MACHINE MANAGING SYSTEM

(71) Applicant: Hitachi Industrial Equipment Systems Co., Ltd., Tokyo (JP)

(72) Inventors: Yoshihiko Sagawa, Tokyo (JP); Akira Iyozumi, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 1115 days.

(21) Appl. No.: 16/642,613

(22) PCT Filed: Aug. 20, 2018

(86) PCT No.: PCT/JP2018/030605
§ 371 (c)(1),
(2) Date: Feb. 27, 2020

(87) PCT Pub. No.: WO2019/044553
PCT Pub. Date: Mar. 7, 2019

(65) Prior Publication Data
US 2020/0201979 A1 Jun. 25, 2020

(30) Foreign Application Priority Data
Aug. 28, 2017 (JP) ................................. 2017-163019

(51) Int. Cl.
*G06Q 10/00* (2023.01)
*F04B 49/06* (2006.01)
*H04L 12/28* (2006.01)

(52) U.S. Cl.
CPC ........... *G06Q 10/00* (2013.01); *F04B 49/065* (2013.01); *H04L 12/2823* (2013.01); *G08C 2201/51* (2013.01)

(58) Field of Classification Search
CPC ............... F04B 49/065; H04L 12/2823; G08C 2201/51; G06Q 10/00
(Continued)

(56) References Cited
U.S. PATENT DOCUMENTS 9,696,056 B1* 7/2017 Rosenberg ............... F24F 11/30
10,362,046 B1* 7/2019 Srinivasan .......... H04L 63/1433
(Continued)

FOREIGN PATENT DOCUMENTS

JP 2002-32880 A 1/2002
JP 2002-61591 A 2/2002
(Continued)

OTHER PUBLICATIONS

Chinese-language Office Action issued in Chinese Application No. 201880052467.7 dated Dec. 13, 2022 (12 pages).
(Continued)

*Primary Examiner* — Kenny Nguyen
(74) *Attorney, Agent, or Firm* — Crowell & Moring LLP

(57) ABSTRACT

An object is to proceed with a contract-concluding process for an operational data transaction simply, conveniently and clearly. A fluid machine including: a driving source; a fluid machine body that generates a fluid by a driving force of the driving source; a controller that has a GUI allowing an external input and output, and controls driving of the driving source; and a communication apparatus that allows communication with an external server via a wired or wireless communication line. In the fluid machine, when transmitting operational information of the fluid machine to the external server, the external server being owned by a third party other than an owner or an authorized person of a legitimate use right of the fluid machine or the external server whose legitimate use right being held by the third party, the controller transmits the operational information after receiv-
(Continued)

ing, via the GUI, an input indicating that the operational information is approved to be output to the third party and to be used by the third party.

4 Claims, 11 Drawing Sheets

(58) Field of Classification Search
USPC .......................................................... 715/764
See application file for complete search history.

(56) References Cited

U.S. PATENT DOCUMENTS

| | | | | |
|---|---|---|---|---|
| 10,540,185 B1 * | 1/2020 | Harris | ................... | G06F 9/4416 |
| 10,698,374 B2 * | 6/2020 | Rivas Sabelle | ...... | G05B 19/042 |
| 2004/0005848 A1 | 1/2004 | Yamaharu | | |
| 2006/0059011 A1 * | 3/2006 | Ulreich | .................. | G06Q 30/00 |
| | | | | 705/400 |
| 2008/0282182 A1 * | 11/2008 | Oosaka | ............... | H04L 12/2814 |
| | | | | 700/90 |
| 2011/0112701 A1 * | 5/2011 | Johnson | ................... | H04Q 9/00 |
| | | | | 702/62 |
| 2011/0113360 A1 * | 5/2011 | Johnson | .............. | H04L 12/2825 |
| | | | | 340/635 |
| 2012/0288393 A1 * | 11/2012 | Sato | ........................ | F01C 17/06 |
| | | | | 418/55.1 |
| 2015/0112542 A1 * | 4/2015 | Fuglewicz | ........... | G07C 5/0858 |
| | | | | 701/1 |
| 2015/0373149 A1 * | 12/2015 | Lyons | .................... | G05B 17/02 |
| | | | | 709/203 |
| 2017/0053210 A1 * | 2/2017 | Duong | ................... | G06N 20/00 |
| 2017/0078110 A1 * | 3/2017 | Han | ...................... | H04L 12/282 |
| 2017/0221011 A1 * | 8/2017 | Von Sichart | ....... | G06Q 10/1093 |
| 2017/0227944 A1 * | 8/2017 | Goli | ........................ | G05B 19/05 |
| 2017/0370368 A1 * | 12/2017 | Srivastava | ............ | F04D 27/001 |
| 2018/0174378 A1 * | 6/2018 | Pauli | ...................... | G07C 5/085 |
| 2019/0004891 A1 * | 1/2019 | Bi | ........................ | G06F 11/0793 |
| 2020/0097430 A1 * | 3/2020 | Maturana | ........... | G05B 19/4185 |
| 2021/0039025 A1 * | 2/2021 | Klein | ................. | B01D 35/1435 |

FOREIGN PATENT DOCUMENTS

| | | |
|---|---|---|
| JP | 2002-157223 A | 5/2002 |
| JP | 2012-3491 A | 1/2012 |
| WO | WO 2015/056640 A1 | 4/2015 |

OTHER PUBLICATIONS

International Search Report (PCT/ISA/210) issued in PCT Application No. PCT/JP2018/030605 dated Dec. 18, 2018 with English translation (four (4) pages).

Japanese-language Written Opinion (PCT/ISA/237) issued in PCT Application No. PCT/JP2018/030605 dated Dec. 18, 2018 (four (4) pages).

Extended European Search Report issued in European Application No. 18852478.9 dated Jul. 9, 2021 (nine (9) pages).

* cited by examiner

COOLER INTAKE AIR

BODY INTAKE AIR

UNIT INTAKE AIR

FLUID MACHINE, FLUID MACHINE MANAGING METHOD AND FLUID MACHINE MANAGING SYSTEM

TECHNICAL FIELD

The present invention relates to a fluid machine, fluid machine managing method and fluid machine managing system, and relates to a fluid machine that externally transmits operational data, a managing method for the fluid machine and a managing system for the fluid machine.

BACKGROUND ART

As represented by the IoT (Internet of the things), techniques of collecting, analyzing and using information related to operational statuses of machines (hereinafter, referred to as "operational data" in some cases) via communication lines are under intensive development.

For example, Patent Document 1 discloses a remote diagnosis system for screw compressors, which technique is for making abnormality diagnosis of a screw compressor by collecting vibration data of the screw compressor at a server apparatus through a network, and comparing, on the server apparatus-side, the vibration data with vibration data that is collected at the time of normal running.

In addition, Patent Document 2 discloses a remote maintenance system for facility instruments, which technique is for using a public line network and a mobile terminal to exchange information with a monitoring apparatus for a facility instrument, and perform remote maintenance.

Such managing services based on operational data are provided on the premise that a service provider acquires operational data of a fluid machine from the owner or the like of the fluid machine, but there is a tendency that operational data that is generated on the machine-side typically belongs to the owner or a user of the machine (hereinafter, simply referred to as "the owner or the like" in some cases). Because of this, in order for a third party other than the owner or the like of the machine to acquire the operational data, approval of the owner or the like of the machine is often obtained in advance (or later on in some cases).

PRIOR ART DOCUMENT

Patent Documents

Patent Document 1: JP-2002-61591-A
Patent Document 2: JP-2002-32880-A

SUMMARY OF THE INVENTION

Problems to be Solved by the Invention

Here, when a service provider who is a third party acquires operational data from the owner or the like of a machine, a contract is typically concluded by making various agreements on the purpose of use, scope of use and the like through exchange of documents, but there is a problem that contract-concluding procedures conducted by using documents are cumbersome.

In addition, even if managing services like the one explained above are not provided, for example, there are cases where the manufacturers of machines demand acquisition and analysis of operational data of the machines for quality management of the performance of the machines, improvement of the performance, and better business-related services. In such cases where a manufacturer or the like acquires only operational data not for the purpose of providing a particular service, there is also a problem in terms of cumbersomeness accompanying manual conclusion of a contract every time such a case occurs.

A technique that allows a contract-concluding process for an operational data transaction to be performed more simply, conveniently and clearly is desired.

Means for Solving the Problems

In order to solve the problems mentioned above, for example, configurations described in CLAIMS are applied. That is, provided is a fluid machine including: a driving source; a fluid machine body that generates a fluid by a driving force of the driving source; a controller that has a GUI allowing an external input and output and that controls driving of the driving source; and a communication apparatus that allows communication with an external server via a wired or wireless communication line. In the fluid machine, when transmitting operational information of the fluid machine to the external server, the external server being owned by a third party other than an owner or an authorized person of a legitimate use right of the fluid machine or the external server whose legitimate use right being held by the third party, the controller transmits the operational information after receiving, via the GUI, an input indicating that the operational information is approved to be output to the third party and to be used by the third party.

In addition, for example, another aspect provides a managing method for a fluid machine having: a driving source; a fluid machine body that generates a fluid by a driving force of the driving source; a controller that has a GUI allowing an information input and output and that controls driving of the driving source; and a communication apparatus that performs an output to an external server with which communication is made possible via a wired or wireless communication line, the managing method including: by the controller, a step of displaying, on the GUI, information indicating whether or not operational information of the fluid machine is approved to be output from the communication apparatus to the external server and to be used at the external server, the external server being owned by a third party other than an owner or an authorized person of a legitimate use right of the fluid machine or the external server whose legitimate use right being held by the third party; a step of receiving, via the GUI, an input indicating consent to the output of the operational information and consent to the use of the operational information; and a step of transmitting the operational information from the communication apparatus to the external server.

In addition, for example, another aspect provides a fluid machine managing system including: a fluid machine having a driving source, a fluid machine body that generates a fluid by a driving force of the driving source, a controller that has a GUI allowing an information input and output and that performs drive control, and a communication apparatus that communicates with an external server with which communication is made possible via a wired or wireless communication line; and the external server. In the fluid machine managing system, when transmitting operational information of the fluid machine to the external server, the external server being owned by a third party other than an owner or an authorized person of a legitimate use right of the fluid machine or the external server whose legitimate use right being held by the third party, the controller receives, via the GUI, approval of providing the operational information to the third party and making available the operational information to the third party, transmits the approval to the external server, and thereafter transmits the operational information to the external server.

Advantages of the Invention

According to the present invention, consent to supply and use of operational data of a fluid machine can be given to a third party other than the owner or a legitimate use rights holder of a fluid machine simply and conveniently via a control section of the fluid machine.

Other configurations, problems and effects related to the present invention become apparent from the following description.

MODES FOR CARRYING OUT THE INVENTION

Hereinafter, modes for carrying out the present invention are explained in detail by using the drawings.

A fluid machine applied in the present embodiment is a compressor that produces compressed gas. Compressors that can be applied include those having various compressing mechanisms such as positive displacement mechanisms or rotary mechanisms (centrifugal mechanisms) that take in gas such as air and discharge compressed air.

Note that the present invention can be applied not only to compressors but also to pumps and expanders.

Figure 1:
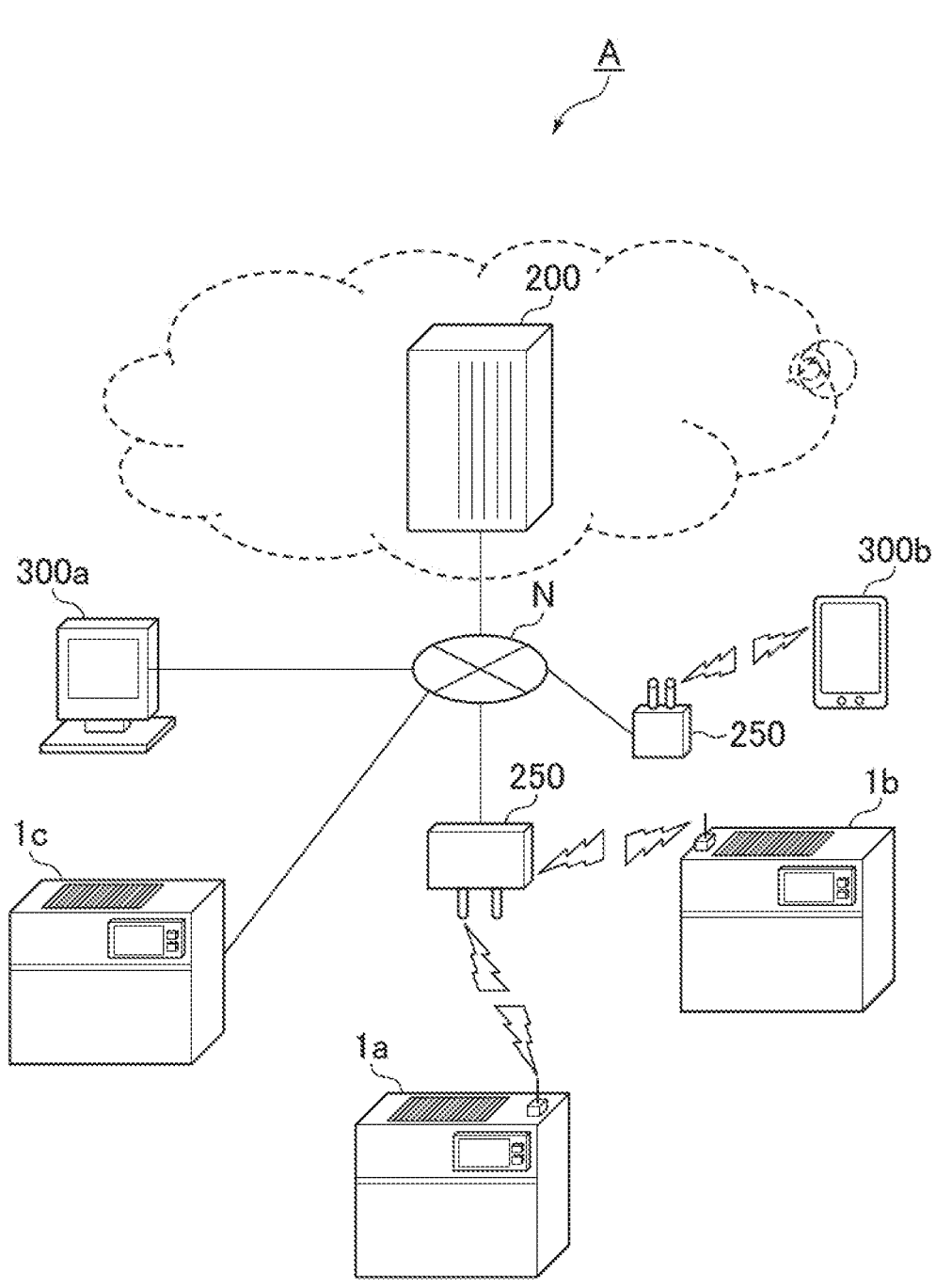
FIG. 1 is a schematic diagram illustrating an overall configuration example of a compressor system as one embodiment to which the present invention is applied.

FIG. 1 schematically illustrates the configuration of a compressor system A which is one embodiment to which the present invention is applied. The compressor system A is configured by connecting compressors 1a to 1c and a server apparatus 200 in a manner that allows communication therebetween via a network N composed of a wired connection, a wireless connection or a combination thereof. Note that a plurality of compressors 1 is not necessarily required, and the present invention can be realized as long as one compressor and one server apparatus 200 constitute a configuration in which they can communicate via a network.

The compressor system A is configured such that the server apparatus 200 can collect and analyze operational data of the compressors 1a to 1c, perform performance management (operation time, detection of abnormality in parts, evaluation of the degrees of deterioration of consumables, and the like) of the compressors, and provide managing services (making diagnosis about the life, informing abnormality, informing times for replacement of consumables, and the like) for the owners or the like of the compressors via the network N, based on results of the analysis. The operational data is information related to various phenomena that occur along with running of the compressors, such as drive time of the compressors, amounts of motive-power energy consumption, temperature and pressure of discharge air, temperature and pressure of suction gas, temperature and amounts of lubricating liquid, temperature and vibrations of driving parts such as bearings, ambient temperature of the environment where the compressors are installed, volume and tone of sound that occurs along with driving, and running time of energy-saving running.

Here, although it is necessary to acquire the operational data from the compressor in order to perform the performance management explained above, and to provide the managing service, in a case where it is deemed that an operational data acquisitor such as the compressor-manufacturer or a service provider does not have a right related to acquisition of the operational data, it is also necessary in some cases to obtain approval from the owner of the compressor or a user holding a legitimate right, for acquisition of the operational information (hereinafter, these are referred to as "the owner or the like" in some cases). In addition, in providing the managing service, normally a service-providing contract is concluded between the service provider and the owner or the like. Although acquisition of operational information by a third party and a service-contract-concluding process are typically performed through exchange of documents and the like, procedural processes correspondingly require a lot of work.

In view of this, one of features of the present embodiment is that an operational data acquisition contract and a managing service contract can be concluded via a GUI provided to a controller 30 of the compressor 1a or the like.

Hereinafter, configurations are mentioned in detail.

In FIG. 1, possible examples of the network N include various communication environments such as LANs, WANs, the Internet, mobile line networks, and combinations thereof. In the present embodiment, the compressors 1a and 1b communicate via a mobile line network through a wireless connection, and for the compressor 1c, communication via the Internet through a wired connection is applied. The compressor 1a and the like include an antenna 27 that can communicate with a base station 250, and the controller of the compressor 1a and the like include a communication I/F section 34 to thereby allow the compressor 1a and the like to communicate with a server apparatus 50.

The communication I/F section 34 of the compressor 1a and the like is given unique communication ID information, and the server apparatus 200 can recognize the compressor 1*a* and the like by using this communication ID information. It is assumed in the present embodiment that the compressor 1*a* uses a mobile line network, and a SIM (subscriber identification module)-ID is used as the communication ID information.

In addition, the compressor 1*c* communicates with the server apparatus 50 by a communication form conforming to TCP/IP or the like, for example, and in this case a MAC address is applied as the communication ID information of the communication I/F section 34.

The server apparatus 200 is constituted by one or more physical or virtual servers or storages, can be realized by a large-scale cloud or fog data center or can be realized as a single PC server; the server apparatus 200 can be constituted in any manner according to the amount of data to be handle and calculation performance.

In addition, the server apparatus 200 is connected also with managing terminals 300*a* and 300*b* of an administrator (e.g., a compressor-managing service provider, and the owner and system administrator of the compressors) via the network N in a manner that allows communication therebetween through a wired or wireless connection, and can perform transmission and reception of information with those managing terminals. Examples of the managing terminals that can be applied include various information communication instruments such as desktop PCs or mobile terminals.

Figure 2:
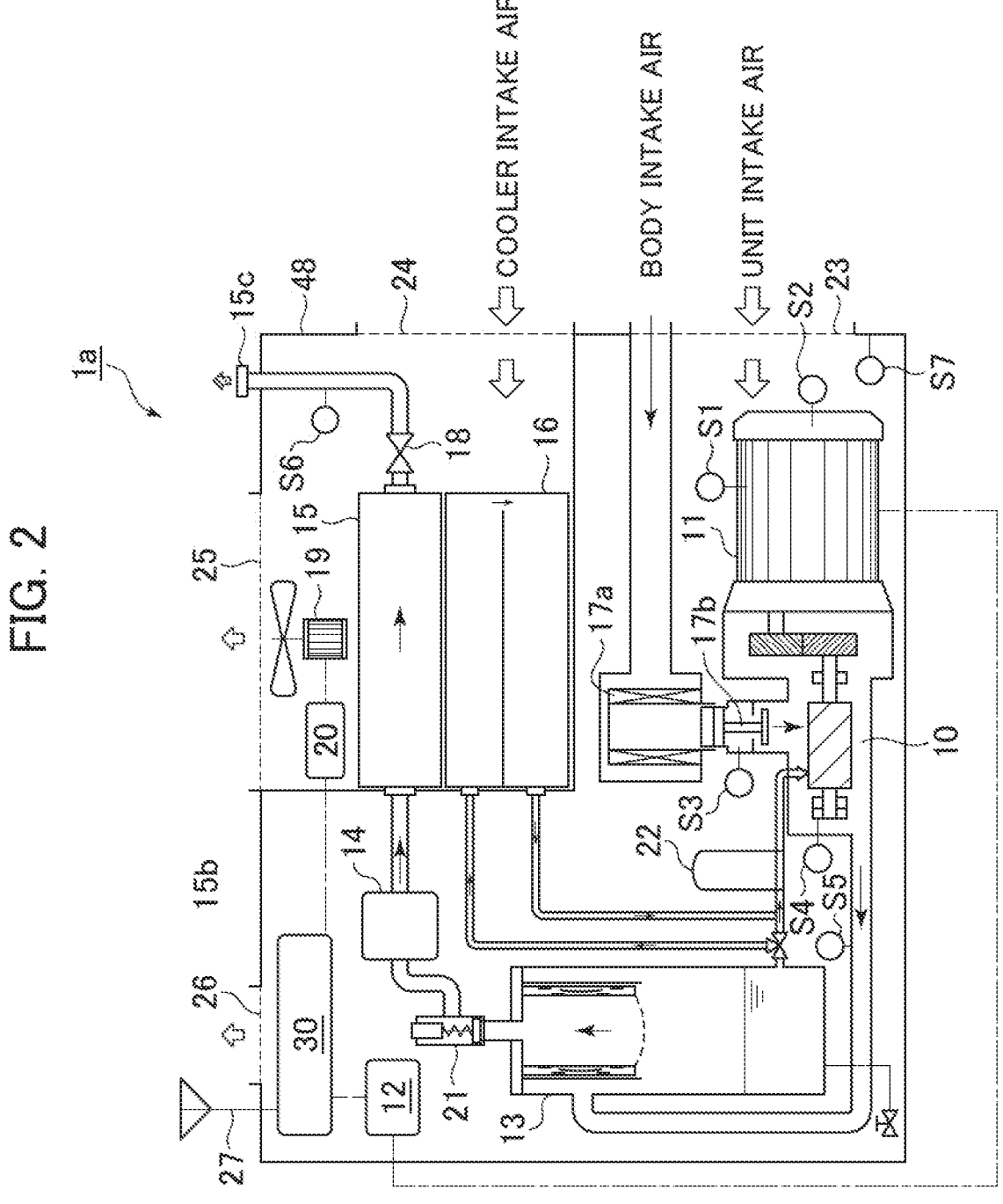
FIG. 2 is a schematic diagram illustrating a configuration example of a compressor to be applied to the present embodiment.

FIG. 2 schematically illustrates the configuration of a compressor (illustrates the configuration of the compressor 1*a* representatively).

The compressor 1*a* mainly includes: a compressor body 10 that sucks air into a compression chamber, and discharges compressed air along with a liquid (which is oil in the present embodiment, but is water in some cases) supplied to the compression chamber; a motor 11 that gives driving force to the compressor body 10; an inverter 12 that converts the frequency of electrical power supplied to the motor 11; a gas-liquid separator 13 that performs primary separation of oil and air from the discharge air by means of the effects of collision or centrifugal force; a filter 14 that further performs secondary separation of oil components from the air having been subjected to the primary separation; an air cooler 15 that cools the compressed air through heat exchange with cooling air from a cooling fan apparatus 19; an oil cooler 16 that cools the oil separated at the gas-liquid separator 13 through heat exchange with the cooling air from the cooling fan apparatus 19; a fan inverter 20 that changes the frequency of electrical power supplied to the cooling fan apparatus 19; the controller 30 that performs drive control of the compressor 1*a;* a suction or discharge piping system for various types of air; various types of detecting apparatus (sensors and the like) that are arranged at individual sections, and detect temperature, pressure, vibrations and sounds; and a package housing 48 that houses these components therein. Note that: 17*a* is an air filter that filters suction air; 17*b* is a suction throttle valve that attempts energy-saving running by adjusting the amount of suction air; 18 is a check valve that inhibits inverse flow of discharge air toward the compressor body 11 side; 21 is a gas-releasing solenoid valve for attempting energy-saving running or the like by releasing air which is on the upstream side of the check valve 18 to the atmospheric air or the like; 22 is an oil filter; and 27 is the antenna 27 that transmits and receives communication radio waves to and from the base station 250.

The detecting apparatuses include: a motor temperature sensor S1 that detects the coil temperature of the motor 11 by a thermistor; a motor bearing sensor S2 that detects vibrations of a bearing of the motor 11; a suction pressure sensor S3 that detects suction-air pressure of the compressor body; a bearing sensor S4 that detects vibrations of a rotor bearing of the compressor; a discharge pressure sensor S5 that detects the temperature of compressed air discharged from the compressor body; a user-side pressure sensor S6 that detects the pressure of air which is on the downstream side of the check valve (user pressure); and an ambient temperature sensor S7 that is arranged near a package suction port 23, and detects the temperature of an ambient environment under which the compressor 1*a* is installed. Detection values of these various types of sensors are output to the controller 30 via control lines which are not illustrated. The control section 30 controls running of the compressor 1*a* based on individual pieces of the sensor information.

Figure 3:
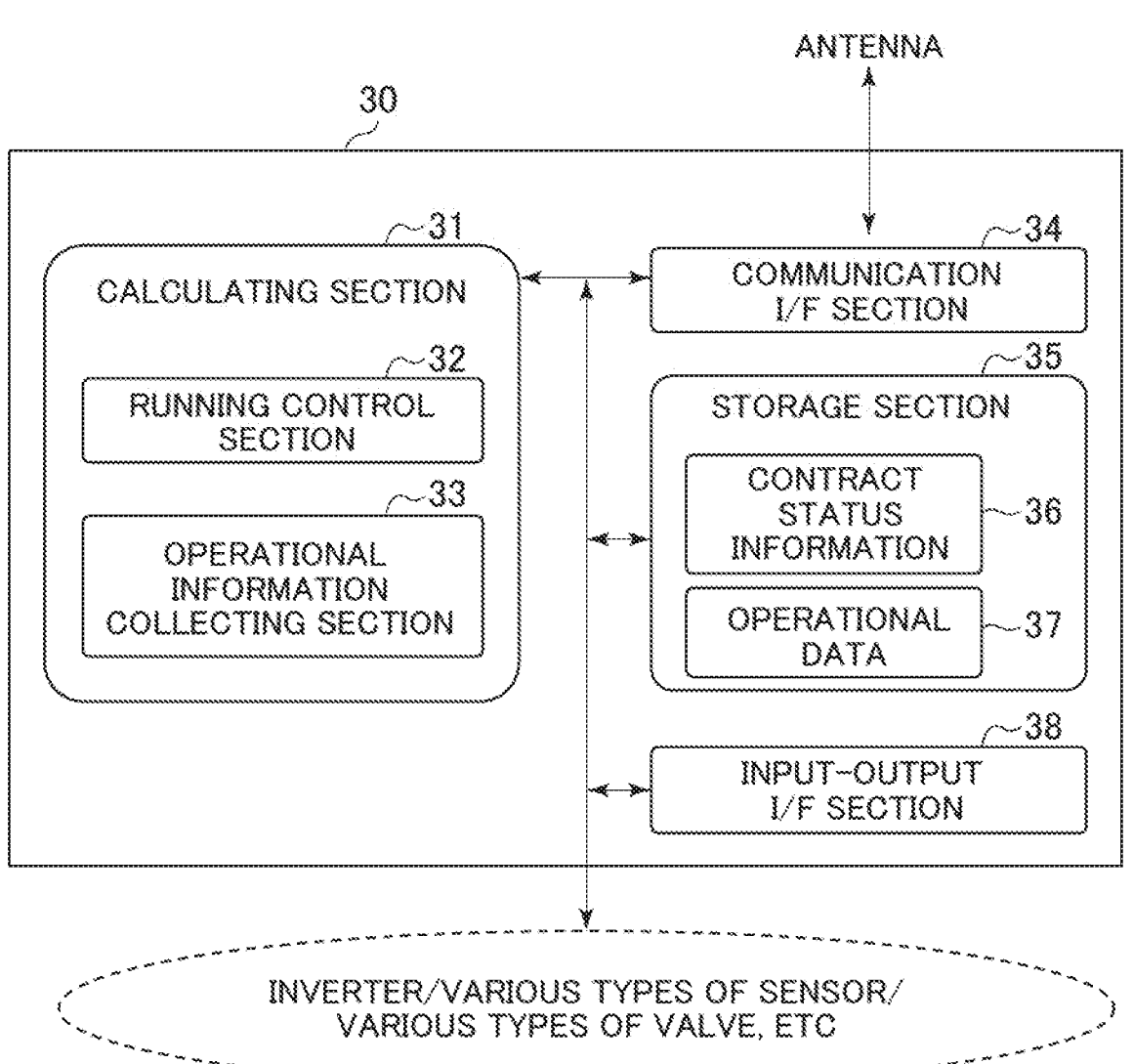
FIG. 3 is a block diagram schematically illustrating a functional configuration example of a compressor controller to be applied to the present embodiment.

FIG. 3 schematically illustrates the functional configuration of the controller 30. the controller 30 includes a calculating section 31, the communication I/F section 34, a storage section 35 and an input-output I/F section 38, and these can perform data transmission and reception via internal connections (buses and substrate wires). The calculating section 30 includes a semiconductor chip such as a microcomputer, and constitutes a control function section of the compressor 1*a* through cooperation with a control program stored in the storage section 35 in advance. In the present embodiment, a running control section 32 and an operational information collecting section 33 of the compressor 1*a* are constituted. The operational information collecting section 33 has functions of collecting detection values from sensors explained above, collecting the output frequencies of the inverters 12 and 20, and storing and saving them as operational data in the storage section 35. After obtaining approval of the owner or the like related to a managing service and an operational data transmission mentioned below, the operational data 37 is output to the server apparatus 200 via the communication I/F section 34 or used when being transferred to an external memory mentioned below.

The communication I/F section 34 is connected with an antenna 39 installed outside or inside the package of the compressor 1*a,* and transmits the operational data 37 to the server apparatus 50 or receives various types of data from the server apparatus 50 when a contract for transmission of the operational data 37 or a managing service contract mentioned below is concluded. Note that in a case of wired connection, the communication I/F section 34 is connected with a wired-connection port.

The storage section 35 is composed of an electrical/magnetic or optical storage medium such as a semiconductor memory or hard disk. The storage section 35 performs storage and update of a running control program and various pieces of information. In the present embodiment, contract status information 36 and the operational data 37 mentioned above are stored.

The contract status information 36 is information used for managing timings at which the owner or the like is notified of a managing service contract or an operational data transmission contract through a GUI 42 mentioned below, and a content of the notification. Specifically, information indicating whether the compressor 1*a* is in an initial activation, and information indicating whether or not it is necessary to perform notification processes again at second or subsequent activation are stored. That is, in a case of initial activation, a process of giving notice on a managing service contract or an operational data transmission contract is executed, and in a case of second or subsequent activation, information related to the time and the like is stored for executing a notification process again after the elapse of a predetermined length of time if the notification process has not been performed at the time of previous activation.

The input-output I/F section is a functional section that receives an input of a manipulation instruction from a compressor user via a UI 40 (user interface) mentioned below, and displays on a display apparatus various types of operational information, setting information and the like of the compressor 1*a*.

Figure 4:
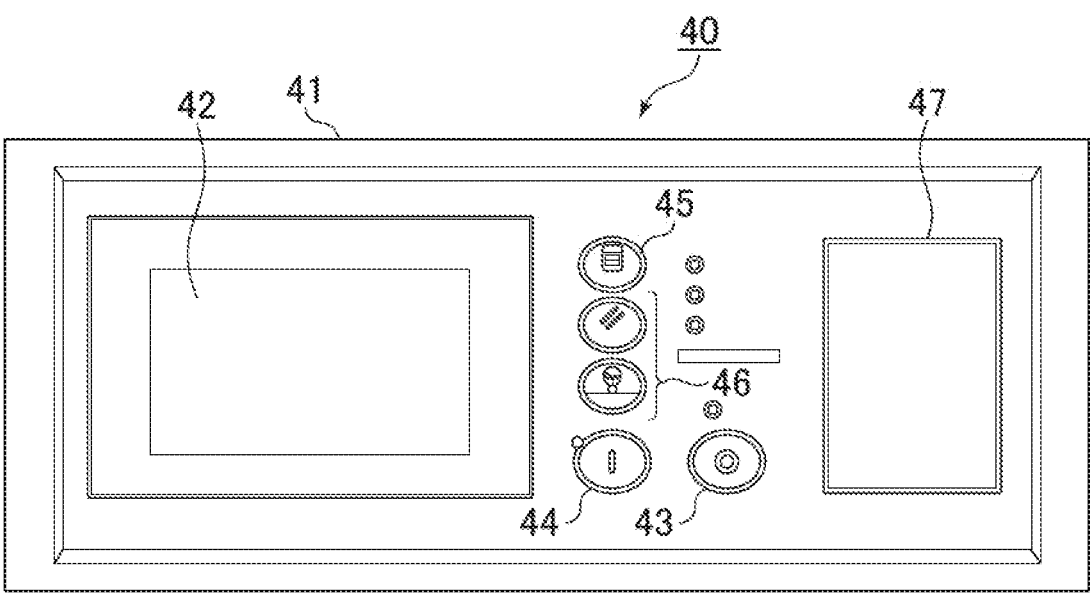
FIG. 4 is a figure illustrating a configuration example of the front surface of the external appearance of a compressor control section UI to be applied to the present embodiment.

FIG. 4 illustrates the external-appearance configuration of the UI 40 of the input-output I/F section 38. The UI 40 includes on a housing 41: the GUI (a graphic user I/F) 42; a mechanical power-ON button 43; and a mechanical power-OFF button 44; a menu button 45; various types of manipulation buttons 46; a terminal box 47 that stores external output terminals for USB (registered trademark); and the like. Examples of touch panels that can be applied include various types of input apparatuses such as electrostatic-type, piezoelectric-type or infrared-type input apparatuses. The housing 41 has a front surface on which the GUI 42 and the like are arranged, and has a rear-surface side on which control parts such as the calculating section 31 are arranged, and the front-surface side thereof is exposed to the outside of the package of the compressor 1*a*. In addition, although in the present embodiment, the housing 41 is integrally installed to be fixed to the compressor 1*a*, it may be installed to be detachable from the compressor 1*a*. Note that by pressing the menu button 45, various manipulation menu items are displayed on the GUI 42 so as to be manipulatable.

The owner or the like of the compressor can perform manipulation of various types of pressure setting parameters of the compressor 1*a*, and observe a screen for procedures of a data transmission contract and a managing service contract mentioned below, via the GUI 42.

Note that by pressing the menu button 45, various manipulation menu items are displayed on the GUI 42 so as to be manipulatable.

Figure 5:
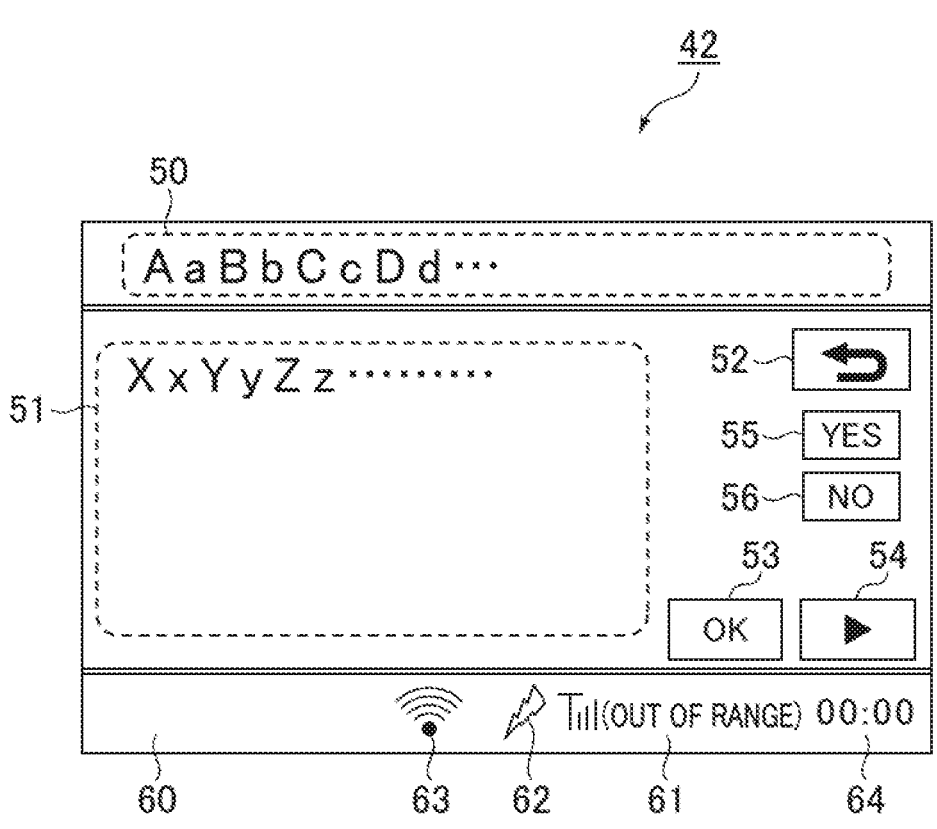
FIG. 5 is a schematic diagram illustrating a screen example of a control section GUI to be applied to the present embodiment.

FIG. 5 schematically illustrates a screen example and a display item example of the GUI 42 displayed for a procedure of a data transmission contract or a managing service contract.

A title field 50 is a field that displays an item name of content displayed on a current screen. In the present embodiment, item names to be displayed include "Check Communication Environment" in a case of manipulation of the communication connection status, and "Check Owner or the Like," "Notification of Transmission Data, etc." and "Check Agreement" in a case of manipulation of a managing service contract procedure or a data transmission/reception contract-concluding procedure.

A text field 51 is a field that displays procedure content and various types of explanation, with text. A Return button 52 is a button to be pressed when returning to a previous screen or the like. A YES button 50 and a NO button 56 are buttons to be used when an answer is given as a response to text content displayed in the text field 51. An OK button 53 is a button to be used when approval is given to an inquiry or the like displayed in the text field 51. A Next button 54 is a button to be pressed in order to move on to a next screen.

A status field 60 is a field that displays the current time or a communication state with marks or the like. In this figure, the connection state is indicated for each communication form of connections established. For example, in a case where a mobile communication network is used, the control section 31 displays a mobile line mark 61, and changes the number of antenna marks of the mobile communication mark according to the level of radio wave intensity as appropriate. When a connection is not established, the calculating section 31 displays "Out of Range." In addition, when operational data is transmitted from the compressor 1*a* while a connection is established, the calculating section 31 displays an in-transmission-process mark 63 as appropriate. Note that a communication mark 62 indicates whether or not communication is established in another communication connection form, and for example in a case where a wired Internet connection is established, the communication mark 62 is displayed when the connection is established, and is hidden when the connection is not established.

Figure 6:
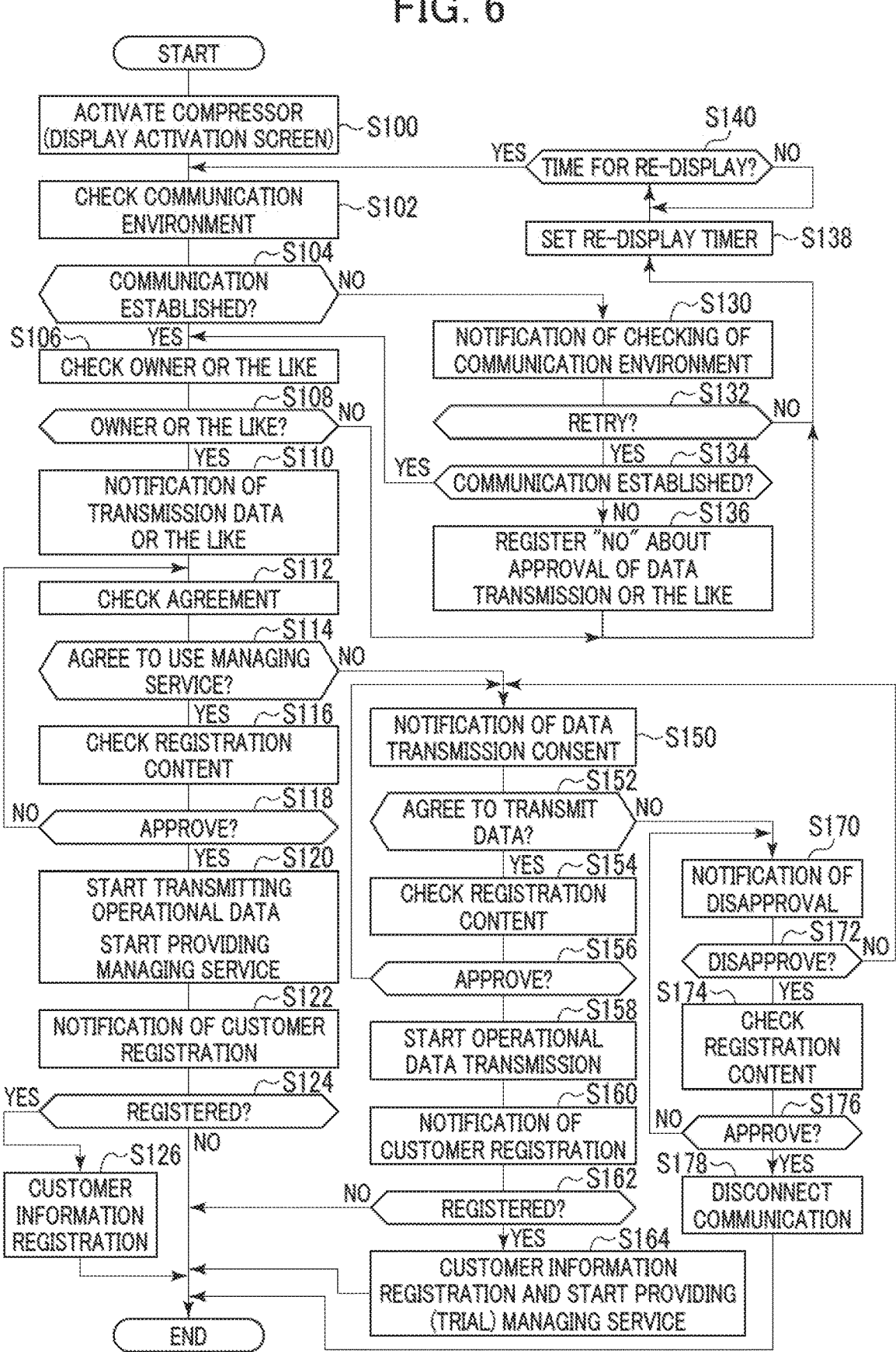
FIG. 6 is a flow chart illustrating processes of the compressor system according to the present embodiment.

The flow of a process of the compressor system A having the configuration explained above is explained by using the flow chart in FIG. 6, and screen transitions illustrated in FIG. 7 to FIG. 11. The present process is executed by the controller 30. Note that in an example explained, the following process uses a mobile communication network as a communication form. In addition, in the example explained, activation of the compressor 1*a* is in an initial activation.

First, at S100, when the power-ON button 43 (refer to FIG. 4) of the UI 40 is pressed by a user, the calculating section 31 reads out a program from the storage section 35, and starts an activation process. At this time, an in-activation process screen is displayed on the GUI 42.

Figure 7A:
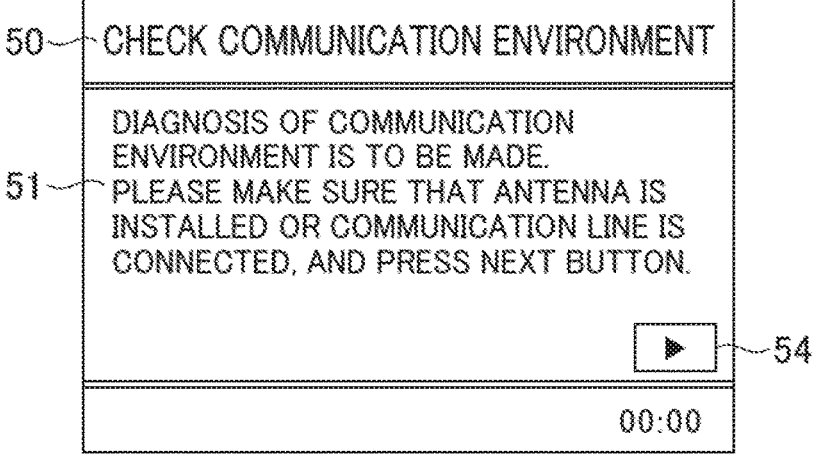
FIGS. 7A to 7C are schematic diagrams illustrating a screen example of the control section GUI to be applied to the present embodiment.

When the activation process is completed, at S102, the calculating section 31 displays a "Check Communication Environment" screen on the GUI 42, for making diagnosis about whether or not a communication connection can be established, and displays a message asking to "check whether an antenna is installed or a communication line is connected" in the text field 51 (screen: FIG. 7A). When the Next button 54 is pressed by the user, the calculating section 31 instructs the communication I/F section 34 to start a process of establishing communication. The communication I/F section 34 performs a push transmission, through the antenna 39, to request to establish a connection, and waits for a response from the base station 250.

Figure 7B:
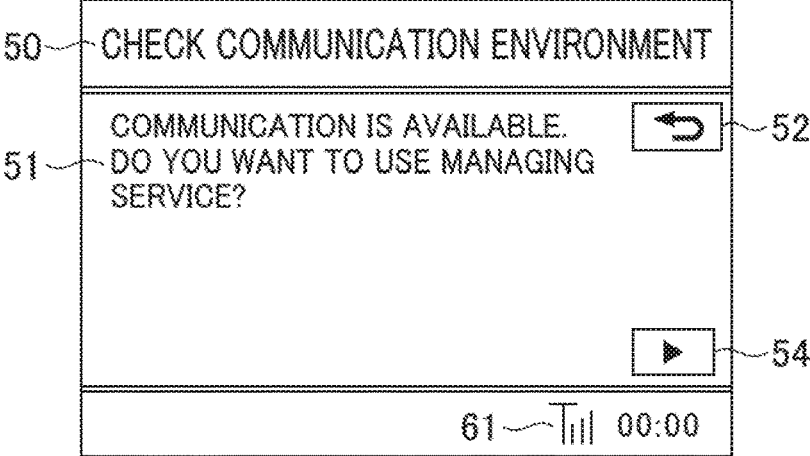

At S104, in a case where there is a connection response from the base station 250 (S104: Y), the calculating section 31 displays a message indicating "communication is available in this environment" and asking "whether to use a managing service for the compressor" in the text field 51 of the GUI 42 (screen: FIG. 7B). Here, in response to pressing of the Next button 54 by the user, the calculating section 31 proceeds to a process of "checking owner or the like" at S106. On the other hand, in a case where there is not a response from the base station 00 at S104 (S104: N), the calculating section 31 proceeds to a reconnection process and a connection stand-by process at S130 to S140.

Figure 7C:
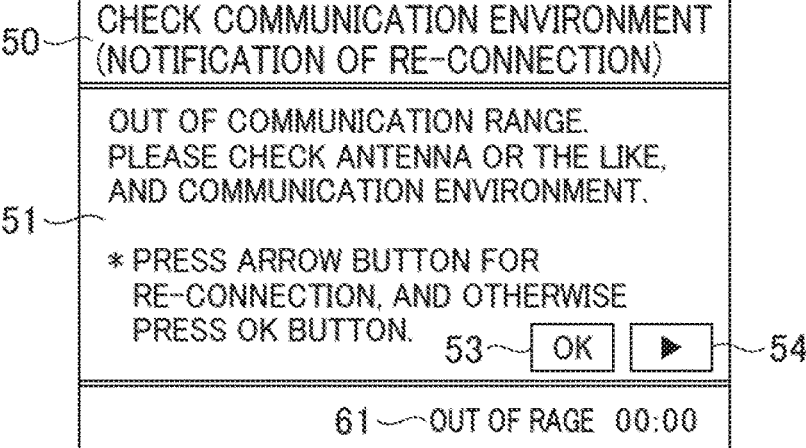

Specifically, at S130, the calculating section 31 displays a message indicating that "the communication environment is out of range," and "prompting to check the installation environment of an antenna or the like" in the text field 51 of the GUI 42, and further, displays the Next button 54 to be used in a case where the reconnection process is performed and the OK button 53 to be used in a case where reconnection is not to be performed (screen: FIG. 7C).

At S132, the calculating section 31 waits for an instruction for performing reconnection (retry) (an input by pressing of the Next button 54) or an instruction for not performing reconnection (an input by pressing of the OK button 54). In a case of performing reconnection (S132: Y), the process proceeds to S134, and in a case of not performing recon-nection (S132: N), the process proceeds to S138.

In a case of performing reconnection (retry), at S134, the calculating section 31 instructs the communication I/F section 34 to perform a process of establishing communication again, and in a case where communication is established (S134: Y), the calculating section 31 proceeds to the process of "checking owner or the like" at S106. On the other hand, if communication cannot be established even after the retry (S134: N), the calculating section 31 proceeds to S136, stores information indicating a communication error in the contract status information 36, and proceeds to a process of S138. Note that at the time of the next and subsequent activations, the calculating section 31 displays a notification process about a managing service contract or an operational data transmission based on the record of communication error. Alternatively, also after the communication error is recorded, the communication I/F section 34 may repeat retrying to establish a connection with the base station 250, and return to the notification process upon establishment of communication.

S138 is a process of issuing a notification asking the owner or the like to check the communication environment again after a predetermined length of time when the user instruction at S132 is an instruction not for reconnection (retry) and when communication cannot be established although a reconnection process is performed at S134. Specifically, at S138, the calculating section 31 sets a re-display timer, and, at S140, the elapse of a predetermined length of time is checked. If the predetermined length of time has elapsed (S140: Y), the calculating section 31 returns to S102, and re-displays a communication environ-ment check process screen again (screen: FIG. 7A). Note that although in the present embodiment, the predetermined length of time until this re-display is performed a predefined length of time (e.g., hours, date, and weeks), it may be determined whether or not to re-display the screen according to the number of times of activation of the compressor, or counting may not be performed for re-display, but separately the process of S102 may be resumed according to manipu-lation on a menu screen.

Next, processes to be performed after communication is established are explained.

Figure 8A:
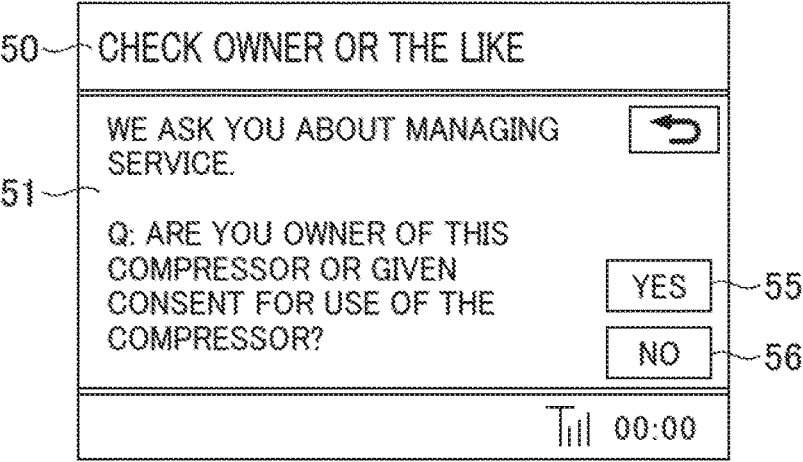
FIGS. 8A to 8C are schematic diagrams illustrating a screen example of the control section GUI to be applied to the present embodiment.

At S106, the calculating section 31 performs the "process of checking owner or the like." That is, the calculating section 31 displays a "Check Owner or the Like" screen on the GUI 42, displays a message asking "whether the user is the owner of the compressor or a person who is given consent for use" in the text field 51, and displays the YES button 55 and the NO button 56 (screen: FIG. 8A). That is, since the right of ownership of operational information of the compressor belongs to the owner of the compressor and a user holding a legitimate use right in some cases where the compressor is a rental item, it is possible to check whether the subject of the contract is a legitimate right holder of the operational data.

At S108, in a case where the calculating section 31 receives an input of the YES button 55 by the user (S108: Y), the process proceeds to S110, and in a case where the calculating section 31 receives an input of the NO button 56 by the user (S108: N), the process proceeds to a process of setting a re-display timer at S138.

Figure 8B:
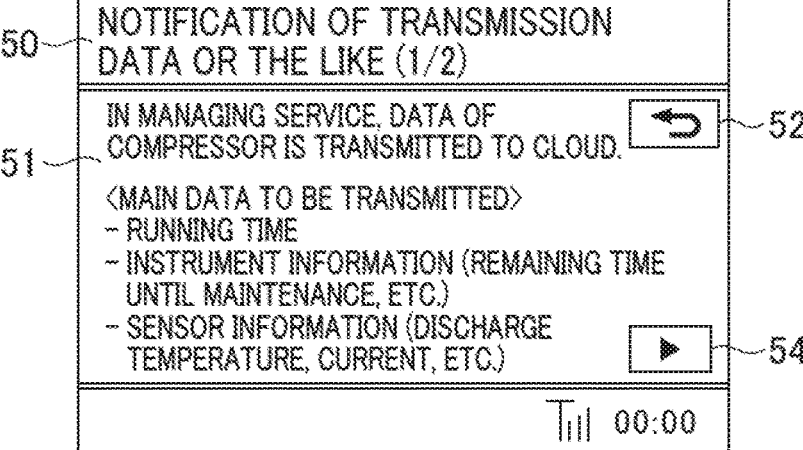

At S110, prior to conclusion of a managing service contract, the calculating section displays a message indicat-ing that "operational data of the compressor 1a is externally transmitted" and "examples of operational data to be trans-mitted" on the GUI 42 (screen: FIG. 8B). That is, it is possible to explain before conclusion of a contract that the operational information is to be supplied to a service pro-vider-side and that the operational information to be sup-plied is specified, and to make it clear that the contract approves provision of information to others, and make clear decision-making about the types of information to be sup-plied.

Figure 8C:
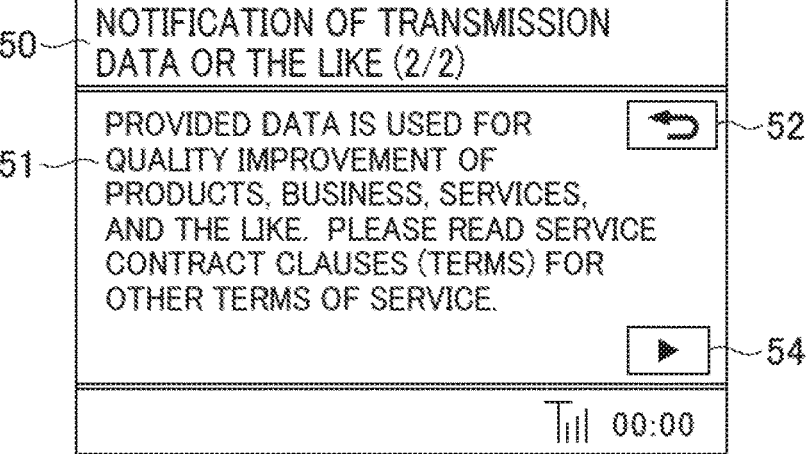

Furthermore, when an input of the Next button 54 by the user is received, the calculating section 31 displays an explanation related to a use purpose of the operational information in the text field 51 on the GUI 42 (screen: FIG. 8C). For example, the use purpose is "to be used for improving products, business and services," and the owner or the like is prompted to give explanation about "checking the content of the terms of service." Note that the Return button 52 is also displayed on the screens in FIGS. 8B and 8C, and the owner or the like can optionally re-check the content of a previous screen.

The calculating section 31 receives an input of the Next button 54 displayed in FIG. 8C from the owner or the like, and proceeds to a process of S112.

Figure 9A:
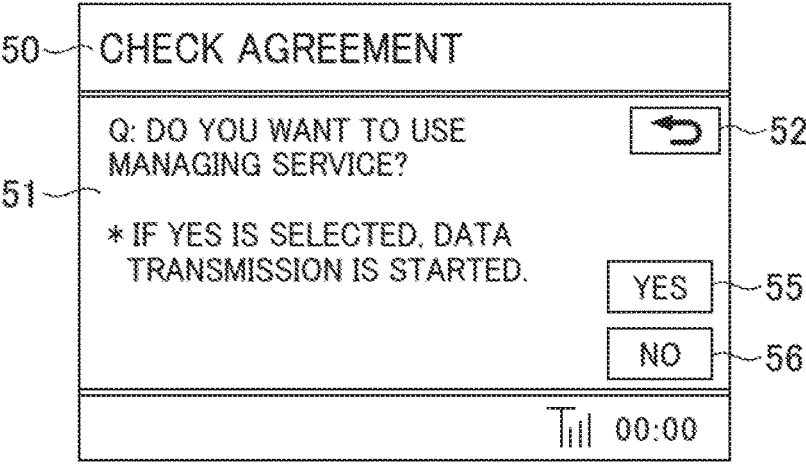
FIGS. 9A to 9C are schematic diagrams illustrating a screen example of the control section GUI to be applied to the present embodiment.

At S112, the calculating section 31 performs a process of "checking agreement." That is, the calculating section 31 displays a screen for checking agreement, on the GUI 42, and displays a message asking "presence or absence of usage of the managing service" (screen: FIG. 9A). In addition, simultaneously, the YES button 55 and the NO button 56 are displayed. It can be said that by clarifying the method for answer to the display content, decision-making of the owner or the like about the operational data trans-mission is made clear. Note that on the same screen, the calculating section 31 also displays a message indicating that "the transmission of the operational data is started if the YES button is pressed," and the owner or the like is clearly notified that the answer of YES serves as an expression of agreement to receive the managing service and agreement to approve the operational data transmission.

Figure 9B:
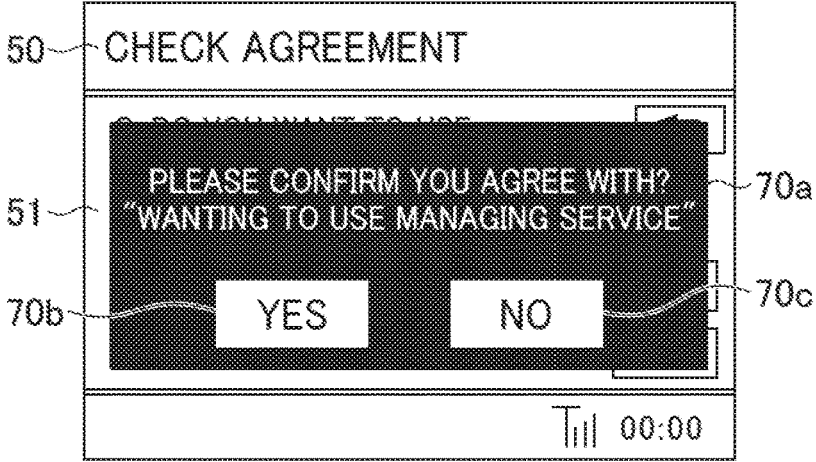
Figure 9C:
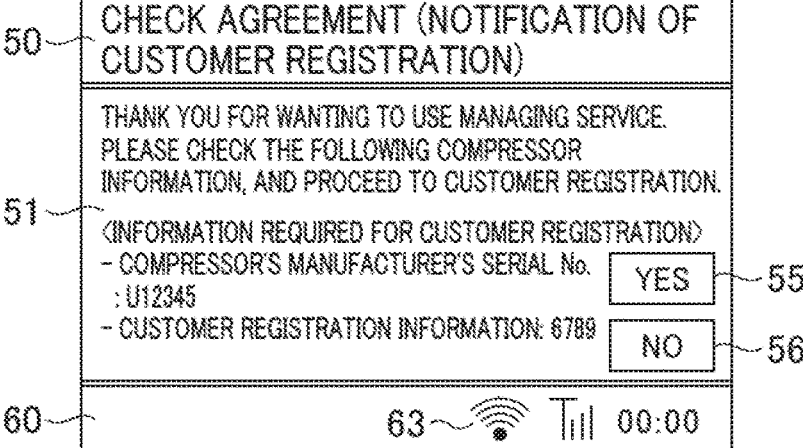

At S114, in a case that an input of the YES button 55 is received (S114: Y), the calculating section 31 proceeds to S116, and performs a process of "checking registration content." The calculating section 31 displays, on the GUI 42, a pop-up display 70a indicating the current contract content and asking whether or not the owner or the like agrees with the contract content (screen: FIG. 9B). Specifically, the current contract content which is "want to be provided with the managing service" is text-displayed on the pop-up display 70a with a background color different from the color of the text field 51, and a pop-up display YES button 70b and a pop-up display NO button 70c are displayed as means to be used for answering whether or not the owner or the like agrees with the content. Agreement of the owner or the like with the answer becomes clearer by re-displaying the con-tract content and asking for final confirmation whether or not the contract content can be approved.

If at S118 an input of the pop-up display YES button 70b is received (S118: Y), the calculating section 31 proceeds to a process of S120. On the other hand, if an input of the pop-up display NO button 70c is received, the calculating section 31 hides the pop-up display 70a, returns to "check agreement" at S112, and displays again a message asking "whether or not to use the managing service" on the GUI 42 (screen: FIG. 9A).

At S120, the calculating section 31 starts collection of operational data from each section of the compressor 1a by using the operational information collecting section 33, and performs the transmission of the operational data to the server apparatus 50 through the communication I/F section 34. During the transmission of the operational data, the calculating section 31 displays the in-transmission-process mark 63 in the status field 60 on the GUI 42 (refer to FIG. 9C, and the like). Then, thereafter, the calculating section 31 starts a reception from the server apparatus 00 of various pieces of information related to the managing service based on the transmitted operational data, uses the various pieces of information for various control of the compressor 1*a*, or displays information related to the service on the GUI 42, and so on.

At S122, the calculating section 31 performs a "customer registration process." That is, the calculating section 31 displays, on the GUI 42, a message indicating a "notification of customer registration," and information necessary for customer registration. The information necessary for customer registration includes a number (symbol) unique to the compressor 1*a* and a number (symbol) unique to the owner or the like (customer). In the present embodiment, a manufacturer's serial number (U12345) is used as the number or the like unique to the compressor 1*a*, and a SIM (6789) is used as the number unique to the owner or the like. The manufacturer's serial number is stored in the storage section 35 of the controller 30 in advance, and the SIM is stored in the communication I/F section 34 in advance, and the calculating section 31 reads out them for display.

Note that in the present embodiment, customer registration is optional for the owner or the like, and the calculating section 31 also displays the YES button 55 and the NO button 56 on the customer registration screen of the GUI 42. If at S124 the calculating section 31 receives an input of the YES button 55 (S124: Y), the calculating section 31 proceeds to S126, displays an electronic address of a HP (homepage) for customer registration on the GUI 42, and exits this flow thereafter. The owner or the like accesses the HP for customer registration through another communication terminal or the like, and registers information including a manufacturer's serial number, a SIM, a name, an address and a form of business of the owner or the like to thereby enable the service provider to know a particular customer and a particular compressor in association with each other thereafter. In addition, if an input of the NO button 56 is received, the calculating section 31 exits this flow.

Next, a process to be performed at S114 if the calculating section 31 is received an answer from the owner or the like of not to be provided with the managing service (S114: N) is explained. One of features of the present embodiment is that the owner or the like is inquired as to whether or not the owner or the like consents to the transmission of operational data even in a case where the owner or the like is not to be provided with the managing service.

Figure 10A:
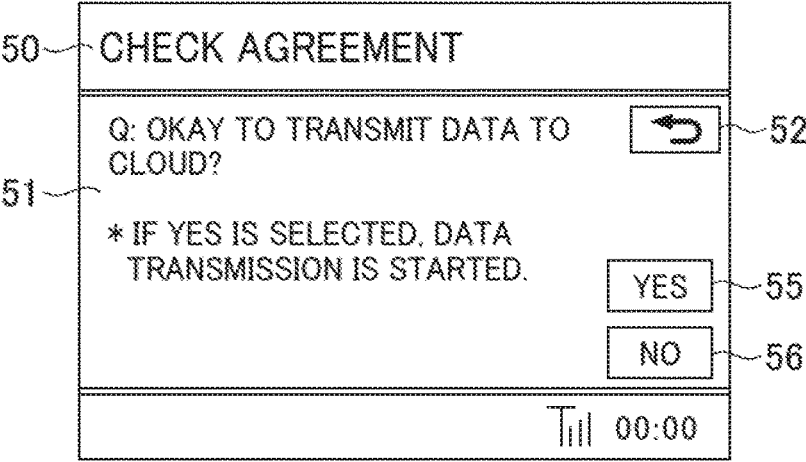
FIGS. 10A to 10C are schematic diagrams illustrating a screen example of the control section GUI to be applied to the present embodiment.

If at S114 an input of the NO button 56 is received (S114: N), the calculating section 31 performs a process of asking "whether or not the transmission of the operational data is approved" at S150. That is, the calculating section 31 displays a message asking "whether the transmission of the operational data to a server apparatus is approved" on the GUI 42, and receives an answer whether or not the transmission is approved through the YES button 55 or the NO button 56 (screen: FIG. 10A).

Figure 10B:
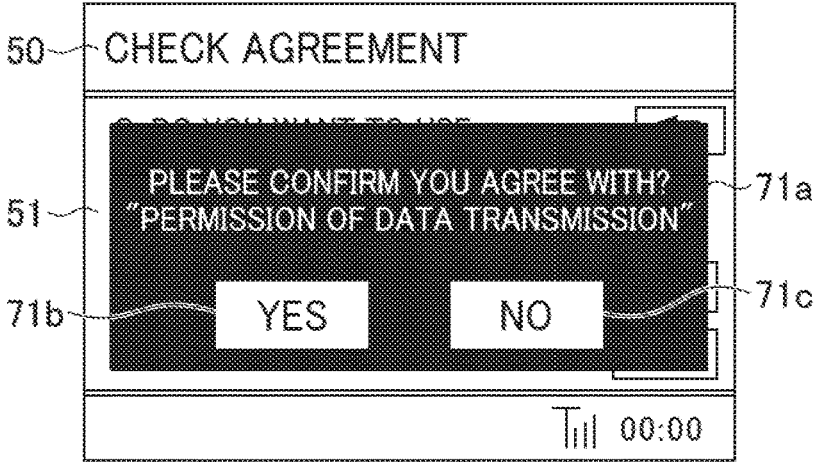

At S152, in a case that an input of the YES button 55 is received (S152: Y), the calculating section 31 proceeds to S154, and performs a process of "checking registration content." Specifically, the calculating section 31 displays, on the GUI 42, a pop-up display 71*a* indicating the current contract content and asking whether or not the owner or the like agrees with the contract content (screen: FIG. 10B). Specifically, the current contract content which is "consent to the operational data transmission" is text-displayed on the pop-up display 71*a* with a background color different from the color of the text field 51, and a pop-up display YES button 71*b* and a NO button 71*c* are displayed as means to be used for answering whether or not the owner or the like agrees with the content. Also in this case, agreement of the owner or the like with the answer becomes clearer by re-displaying the contract content and asking for final confirmation whether or not the owner or the like approves the contract content.

If at S156 an input of the pop-up display YES button 71*b* is received (S156: Y), the calculating section 31 proceeds to a process of S158. On the other hand, if an input of the pop-up display NO button 71*c* is received (S156: N), the calculating section 31 hides the pop-up display 71*a*, and returns to the process of asking "whether or not the operational data transmission is approved" at S150.

At S158, the calculating section 31 starts collection of operational data from each section of the compressor 1*a* by using the operational information collecting section 33, and performs the transmission of the operational data to the server apparatus 50 through the communication I/F section 34. During the transmission of the operational data, the calculating section 31 displays the "in-transmission-process" mark 63 in the status field 60 on the GUI 42 (refer to FIG. 10C, and the like).

Figure 10C:
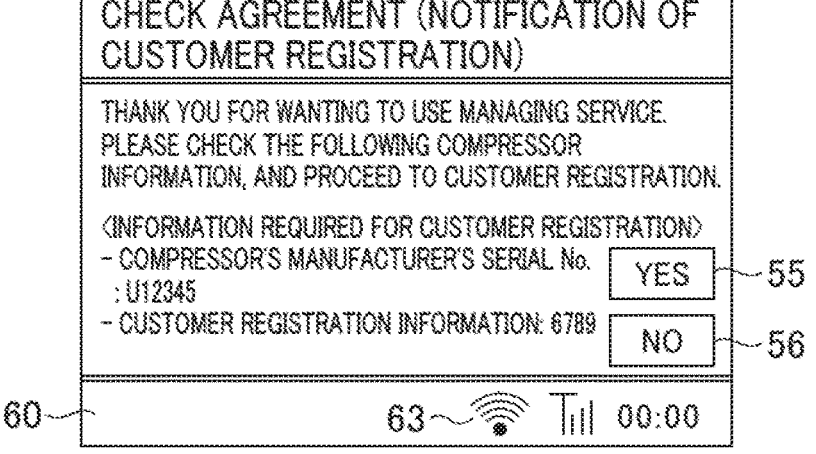

At S160, the calculating section 31 performs a process of "giving notice on customer registration." That is, the calculating section 31 displays, on the GUI 42, messages indicating that "notification of customer registration is given" and "it is possible to be provided of time with a trial managing service after customer registration," and information necessary for customer registration (screen: FIG. 10C). Providing the trial managing service includes providing the managing service for a predetermined period, providing a simplified version of the managing service, providing both, or the like. If at S162 an input of the YES button 55 is received (S162: Y), the calculating section 31 proceeds to S164, displays an electronic address of a HP (homepage) for customer registration on the GUI 42, and thereafter, similar to S126, starts providing the trial version of the managing service from the managing server 00 if the owner or the like performs customer registration.

In addition, if an input of the NO button 56 is received (S162: N), the calculating section 31 exits this flow.

Last, a case where both the provision of the managing service and the transmission of the operational data are disapproved is explained.

Figure 11A:
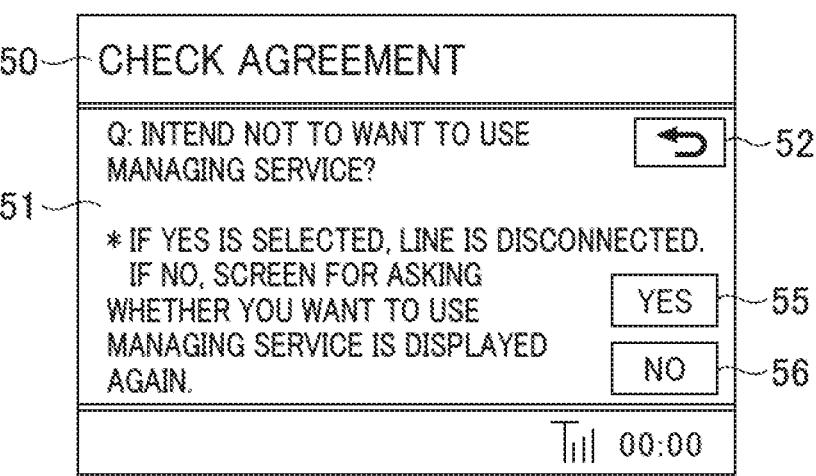
FIGS. 11A to 11B are schematic diagrams illustrating a screen example of the control section GUI to be applied to the present embodiment.

When an input of the NO button 56 is received at S152 (S152: N), the calculating section 31 performs a process of "checking disapproval" at S170. That is, the calculating section 31 displays a message for "checking whether the owner or the like agrees not to use the managing service or the like" on the GUI 42, displays the YES button 55 and the NO button 56, and displays a message indicating that "the communication line is disconnected if YES" or the like (screen: FIG. 11A).

Figure 11B:
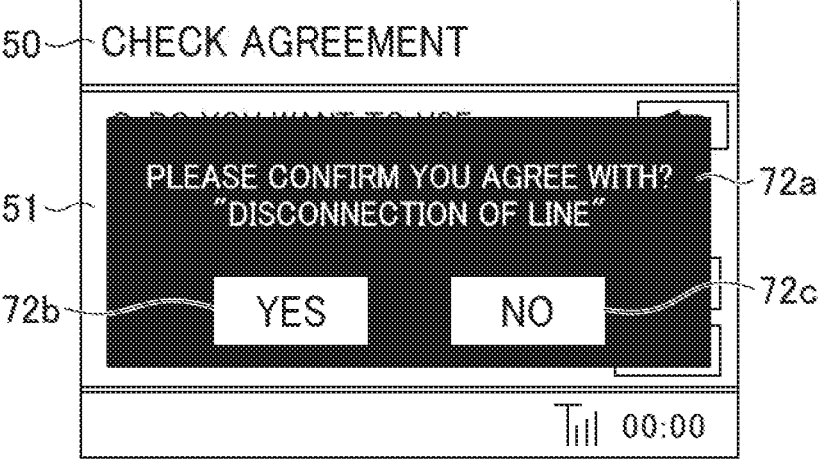

If an input of the YES button 55 is received at S172 (S172: Y), the calculating section 31 displays a pop-up display 72*a* indicating that the communication is to be disconnected on the GUI 42 at S174 (screen: FIG. 11B). On the other hand, if an input of the NO button 55 is received at S172, the calculating section 31 returns to S150.

At S174, the calculating section 31 performs a process of "checking registration content." That is, the calculating section 31 displays a message indicating that "the communication line is to be disconnected" on the GUI 42, and displays a pop-up display YES button 72*b* and a pop-up display NO button 72*c*.

If an input of the pop-up display YES button 72*b* is received at S176 (S174: Y), the calculating section 31 proceeds to S178, disconnects the communication line, and exits this flow. In addition, if an input of the pop-up display NO button 72*c* is received, the calculating section 31 returns to S170.

In this manner, the present embodiment allows the owner or the like of operational data of the compressor to express his/her agreement or disagreement as to approval of the transmission of the operational data to others, simply and conveniently through the controller installed in the compressor. In addition, an expression of agreement as to whether or not to be provided with a managing service based on the operational data can also be performed simply and conveniently. In particular, while it is cumbersome for the owner or the like who owns a large number of apparatuses and instruments such as compressors to perform the procedures for approval of the operational data transmission for each of the apparatuses and instruments by separately exchanging documents and the like, the present embodiment allows the owner or the like to express agreement simply, conveniently, and directly through the apparatuses and instruments.

In addition, the present embodiment allows conclusion of the managing service contract and the operational data transmission contract to be performed simultaneously through the controller of the compressor.

In addition, with the present embodiment, it is possible to flexibly cope with a case where an operational data transmission is approved while a managing service contract is not necessary.

Although modes for carrying out the prevent invention are explained above, the present invention is not limited to the various configurations and processes explained above, and it is needless to say that various replacements and changes are possible within a scope not deviating from the gist of the present invention. For example, although in the present embodiment, notification of the managing service contract is performed, and thereafter notification asking whether or not the operational data transmission is approved is given, the order may be reversed.

In addition, although in the present embodiment explained, the procedure of the customer information registration at S126 and S164 is performed by the owner or the like using another information communication terminal, a software-keyboard function may be provided to the GUI 42 to allow the customer information registration to be performed therethrough.

DESCRIPTION OF REFERENCE CHARACTERS

1*a*, 1*b*, 1*c*: Compressor
10: Compressor body
11: Motor
12: Inverter
13: gas-liquid separator
14: Filter
15: Air cooler
16: Oil cooler
17*a*: Air filter
17*b*: Suction throttle valve
18: Check valve
19: Cooling fan apparatus
20: Fan inverter

21: Air release valve
22: Oil filter
23: Unit inlet port
24: Cooler inlet port
25: Cooler exhaust port
26: Unit exhaust port
27: Antenna
30: Controller
31: Calculating section
32: Running control section
33: Operational information collecting section
34: Communication I/F section
35: Storage section
36: Contract status information
37: Operational data
38: Input-output I/F section
40: UI
41: GUI
43: ON button
44: OFF button
45: Menu button
46: Setting button
47: Terminal storage box
48: Package housing
50: Title field
51: Text field
52: Return button
53: OK button
54: Next button
55: YES button
56: NO button
60: Status field
61: Mobile line mark
62: Communication mark
63: "In-transmission-process" mark
64: Time
70*a*, 71*a*, 72*a*: Pop-up display screen
70*b*, 71*b*, 72*b*: Pop-up display YES button
70*c*, 71*c*, 72*c*: Pop-up display NO button
200: Server apparatus
250: Base station
300*a*, 300*b*: Managing terminal
N: Network

The invention claimed is:

1. A fluid machine comprising:

a driving source;

a fluid machine body that generates a fluid by a driving force of the driving source;

a controller that has an input-output I/F and controls driving of the driving source;

a plurality of sensors configured to detect a plurality of physical characteristics of the fluid machine and output information corresponding to the plurality of physical characteristics; and a communication apparatus that allows communication with an external server via a wired or wireless communication line, wherein the controller has a storage section that stores the information output from the plurality of sensors as operational information of the fluid machine, the controller is configured to display, on the input-output I/F, information to confirm whether or not to use a managing service of the external server based on the operational information of the fluid machine stored in the storage section, store, in the storage section, an input indicating that the managing service is to be used, in response to receiving, via the input-output I/F, the input indicating that the managing service is to be used, display, on the input-output I/F, information to confirm whether or not the operational information of the fluid machine is approved to be output to the external server, in response to receiving, via the input-output I/F, an input indicating that the managing service is not to be used, store, in the storage section, an input indicating that the operational information is approved to be output to the external server, in response to receiving, via the input-output I/F, the input indicating that the operational information is approved to be output to the external server, transmit the operational information of the fluid machine to the external server via the communication apparatus, when the input stored in the storage section is the input indicating that the managing service is to be used, and transmit the operational information of the fluid machine to the external server via the communication apparatus, when the input stored in the storage section is the input indicating that the operational information is approved to be output to the external server.

2. The fluid machine according to claim 1, wherein the controller is configured to disconnect a communication line to the external server, in response to receiving, via the input-output I/F, an input indicating that the operational information is not approved to be output to the external server.

3. A controlling method of a fluid machine configured to obtain sensor information corresponding to physical characteristics of the fluid machine, the controlling method comprising:

a step of storing the sensor information as operational information of the fluid machine;

a step of receiving an input of whether or not to use a managing service of the external server based on the operational information;

a step of storing information indicating that the managing service is to be used, in response to receiving an input indicating that the managing service is to be used;

a step of receiving an input of whether or not the operational information of the fluid machine is approved to be output to the external server, in response to receiving an input indicating that the managing service is not to be used;

a step of storing information indicating that the operational information is approved to be output to the external server, in response to receiving an input indicating that the operational information is approved to be output to the external server;

a step of transmitting the operational information of the fluid machine to the external server, when the stored information is the information indicating that the managing service is to be used, and a step of transmitting the operational information of the fluid machine to the external server, when the stored information is the information indicating that the operational information is approved to be output to the external server.

4. The controlling method of the fluid machine according to claim 3, the controlling method further comprising:

a step of disconnecting a communication line to the external server, in response to receiving an input indicating that the operational information is not approved to be output to the external server.

* * * * *